United States Patent
Gribler

(10) Patent No.: US 8,199,053 B2
(45) Date of Patent: Jun. 12, 2012

(54) THREE DIMENSIONAL RF SEARCH SYSTEM

(75) Inventor: Michael G. Gribler, Marysville, WA (US)

(73) Assignee: Agilent Technologies, Inc., Santa Clara, CA (US)

(*) Notice: Subject to any disclaimer, the term of this patent is extended or adjusted under 35 U.S.C. 154(b) by 1259 days.

(21) Appl. No.: 11/933,328

(22) Filed: Oct. 31, 2007

(65) Prior Publication Data

US 2011/0050502 A1    Mar. 3, 2011

(51) Int. Cl.
*G01S 5/02* (2010.01)
*G01S 13/00* (2006.01)

(52) U.S. Cl. ............................ 342/417; 342/56; 342/443

(58) Field of Classification Search ............... 342/56, 342/113, 139, 147, 417, 443; 244/3.14, 3.19; 369/47.15, 47.28
See application file for complete search history.

(56) References Cited

U.S. PATENT DOCUMENTS

| | | | | |
|---|---|---|---|---|
| 5,061,930 | A | * | 10/1991 | Nathanson et al. ............. 342/13 |
| 2002/0089449 | A1 | * | 7/2002 | Fox ............................... 342/417 |
| 2007/0091747 | A1 | * | 4/2007 | Ueno ........................... 369/47.28 |

* cited by examiner

*Primary Examiner* — Dao Phan

(57) ABSTRACT

An RF signal detection process by incorporating direction detection of the RF signal along with energy detection to arrive at a signal of interest (SOI). The SOI is identified by matching direction detections and energy detections. Low-level and noise-like signals can be reevaluated for unresolved direction detections or energy detections. The RF signal detections can be filtered based on valid direction detections very early on in the processing chain to reduce the amount down-stream processing required.

20 Claims, 5 Drawing Sheets

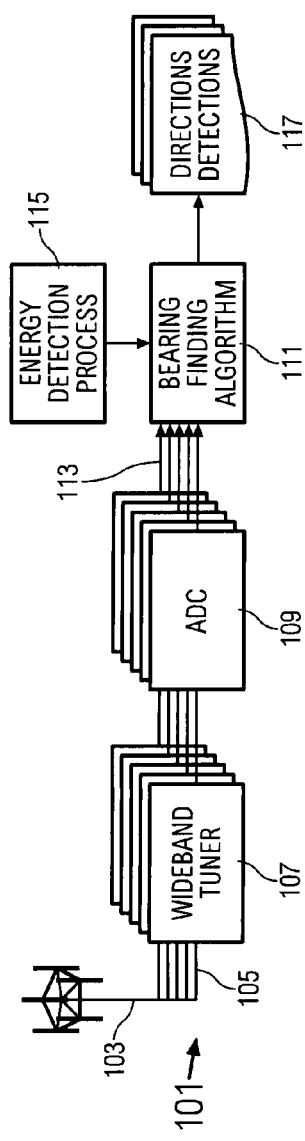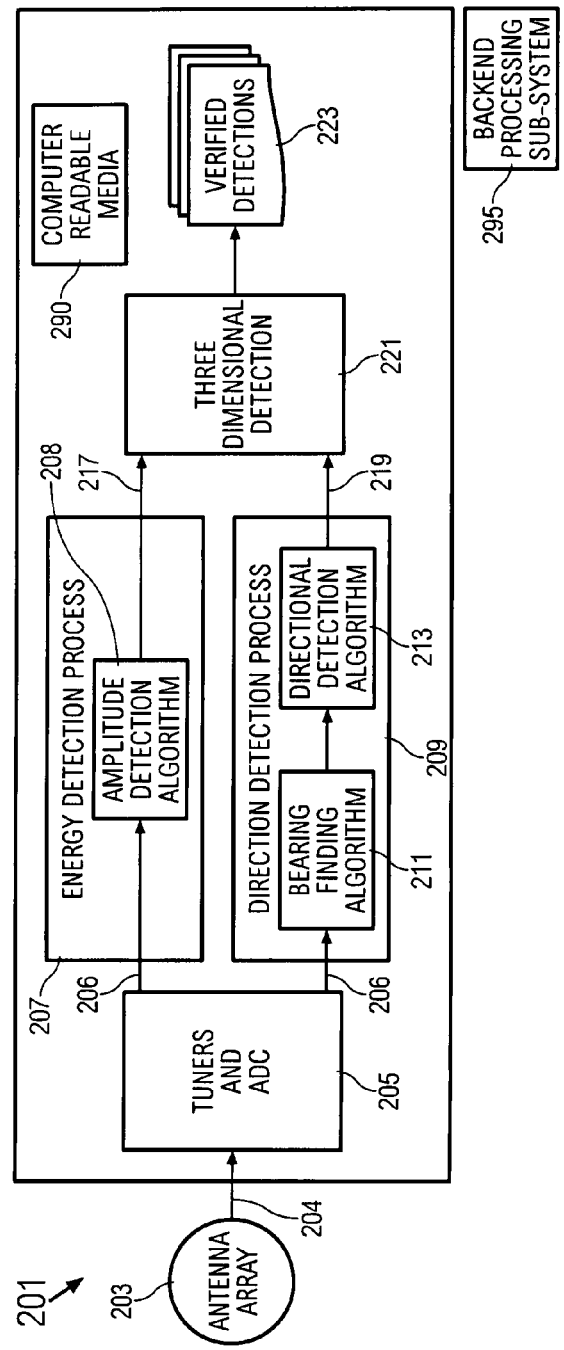

THREE DIMENSIONAL RF SEARCH SYSTEM

BACKGROUND OF THE INVENTION

Radio Frequency (RF) search systems convert RF energy into a stream of time domain data. The RF search systems perform the search function with an antenna, an RF tuner, an Analog-To-Digital (ADC) converter, and computer processing equipment. The ADC represents the RF energy in the time domain. The time domain data is then translated into a frequency domain via a Fast Fourier Transform (FFT). Once in the frequency domain, a threshold is applied to distinguish RF energy from a noise floor.

A detection algorithm is applied to compute the frequency and bandwidth of a Signal of Interest (SOI). The algorithm includes routines to extract additional features of the RF energy, such as its centroid frequency and total power. A system with the characteristics described above using the amplitude of the RF energy to distinguish from the noise floor is termed an "energy detection" system. An example of such an energy detection RF search system is the E3238s from Agilent Technologies, Inc. of Santa Clara, Calif.

A wideband Bearing Finding (BF) system is an enhanced search system using the bearing (direction) properties of the RF signal to characterize the SOI. The wideband BF system can collect multiple RF signals simultaneously. The wideband BF system comprises two or more wideband tuners and digital signal processors to identify the bearing of the RF signals.

FIG. 1 is a block diagram of a wideband BF system 101. An antenna array 103 collects multiple RF signals simultaneously. The wideband data stream 105 is fed into wideband tuners 107 and ADCs 109 before being converted into multiple narrowband streams 113 that are fed to a BF algorithm 111.

The wideband BF system 101 contains energy detection capabilities to improve the energy detection process. The energy detection capability is provided in the form of an energy detection process 115 as an input to the BF system 101. The wideband BF system 101 is tasked to locate and identify an RF signal when first instructed by the energy detection process 115. Once an energy detection is affirmed, the wideband BF system 101 acquires from the BF algorithm 111 the direction for the frequency of the energy detection. The output of system 101 is a list of valid direction detections 117. An example of such a wideband BF system 101 is the Model 803WT VHF/UHF COMINT BF System from TCI of Fremont, Calif.

Antenna directionality can also be employed to increase the probability of locating an SOI in the energy detection RF search system. Unfortunately, a major challenge encountered by the energy detection RF search system described above is the inability to detect low-level signals, and legitimate signals embedded in the noise floor ("noise-like"). Additionally, energy detection RF search systems can be overloaded with additional detections generated from identifying signals from all directions, even when an SOI has been identified beforehand.

In another scenario, an RF signal bordering on the amplitude threshold might not meet the energy detection criteria. The RF signal can be detected if the amplitude threshold were adjusted. A disadvantage of adjusting the threshold is an increase of the total number of energy detections and a decrease in quality of the energy detections. This can be a major issue to systems that receive these detections. These systems must be able to handle the rate of detections that typically lead to larger, heavier, and more power consuming systems. These solutions lead to a higher expense in operating such systems.

The wideband BF system 101 can detect the SOI with greater precision, but inherits the disadvantages of the energy detection. This is because the wideband BF system 101 is tasked by the energy detection 115 input to identify the SOI.

Accordingly, a need exists to accurately search and identify an SOI.

BRIEF DESCRIPTION OF THE DRAWINGS

FIG. 1 is a block diagram of a wideband Bearing Finding system known in the art;

FIG. 2 is a block diagram describing the inventive signal search system;

DETAILED DESCRIPTION

Figure 3:
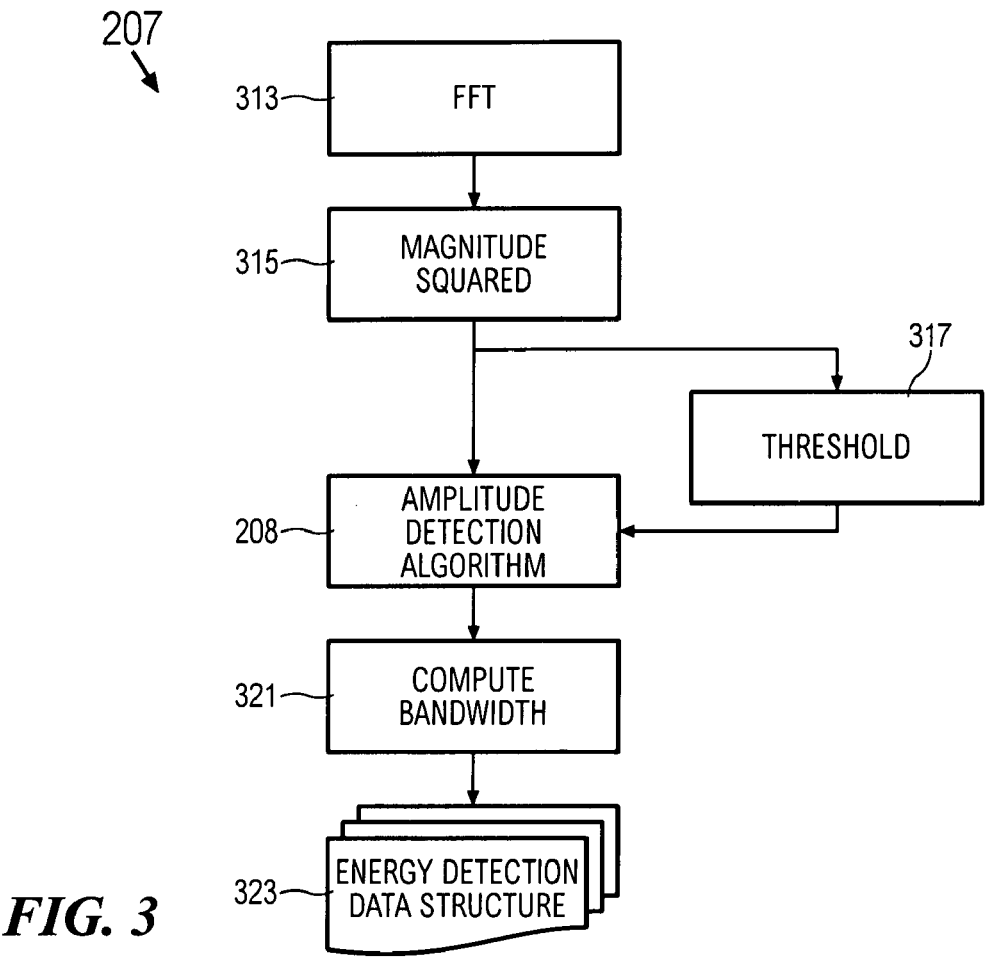
FIG. 3 is a flow chart of an Energy Detection Process.

A signal search system that expands on the known standards of energy detection and that employs an enhanced direction detection is described herewith. The output of the energy detection and the enhanced direction detection processes are combined to improve the signal search system's ability to detect signals that are either noise-like or at a very low energy level. The signal search system provides a filtering capability that will only allow direction detections from one or more specified directions to be passed on to a backend processing sub-system This allows for greater efficiency during processing.

The signal search system accurately searches and identifies an SOI using a three stage process. The first two stages are done in parallel. The two stages comprise an Energy Detection Process and an inventive Direction Detection Process. The output of the two stages is two data lists characterizing the RF signal. The two lists are sent to a third stage, termed "Three Dimensional Detection Process". The Three Dimensional Detection Process matches the data from the two data lists to identify valid detections. The identified SOI can be used to reduce the down-stream processing for subsequent searches; characteristics of verified detections can be used to filter indeterminate RF signal detections early in the processing chain to reduce the amount down-stream processing.

FIG. 2 is a block diagram describing a signal search system 201. The signal search system 201 comprises an antenna array 203. The antenna array 203 senses raw RF signals and passes analog RF signals 204 to a combined block of tuners and digitizers 205. The output of the tuners and digitizers (ADC) block 205 is digitized RF data 206. The digitized RF data 206 is then sent along two parallel paths, the Energy Detection Process 207 and a Direction Detection Process 209. The Energy Detection Process 207 processes the RF data 206 using an amplitude based threshold in an Amplitude Detection Algorithm 208 (described in detail below). The output of the Amplitude Detection Algorithm 208 is a list of Energy Detections data 217 of the RF data 206.

In a parallel process, the Direction Detection Process 209 directs the RF data 206 through a Bearing Finding Algorithm 211 and a Directional Detection Algorithm 213. The output of Direction Detection Process 209 is a list of Direction Detection data 219 of the RF data 206.

The two lists, Energy Detection data 217 and Direction Detection data 219, are sent to the Three Dimensional Detection Process 221. The Three Dimensional Detection module 221 processes the Energy Detection data 217 and the Direction Detection data 219 to seek a match between the two data lists. When an overlap is affirmed, the Three Dimensional Detection Process 221 reports a valid RF signal detection and stores it in a "Verified Detections" data structure 223. The Three Dimensional Detection Process 221 can alter the detection parameters in the Energy Detection Process 207 or the Direction Detection Process 209. This is done to reevaluate noise-like or very low-level RF signals that may not have been detected initially by the Energy Detection Process 207 or the Direction Detection Process 209.

FIG. 2 also describes computer readable media 290 containing code for providing instructions to and for execution by the signal search system 201. The computer readable media also provides storage for the various data structures used by the Energy Detection Process 207, the Direction Detection Process 209, and the Three Dimensional Detection Process 221. The computer readable media 290 can be, for example, a ROM, a RAM, a DVD, a hard drive, or other computer readable media known in the art. Alternatively, the code and data structures can reside on a computer external to the signal search system 201 that controls the signal search system 201.

FIG. 2 further describes a backend processing sub-system 295 for passing data for further processing of data. The Verified Detections data 223 consists of a frequency, amplitude, bandwidth, and direction values. This can be passed to the backend processing sub-system 295. The backend processing sub-system 295 will then task its processing resources based on these detections. With the signal search system processing detections from both amplitude and directional information, a filtering capability can be implemented in the backend processing sub-system that will only allow direction detections from one or more specified directions to be passed on to a backend processing sub-system. For example, the RF signal can be filtered based on valid direction detections very early on in the processing chain to reduce the amount down-stream processing required. An example of such a backend processing sub-system 295 is a recording sub-system. The recording sub-system will receive a detection from the Verified Detections data structure 223 and assign one of the tuners to the frequency and bandwidth of the verified detection. It will then digitize the output of the tuner and digitizers block 205 and copy the digital data stream to a file on a computer's hard drive.

FIG. 3 is a flow chart of the Energy Detection Process 207 used within the signal search system 201. The RF signal 206 is converted to the frequency domain using a Fast Fourier Transform (FFT) 313. The FFT representation of the RF signal is squared in Block 315 and passed onto the Amplitude Detection Algorithm 208. The magnitude of the squared FFT representation ("magnitude-squared spectral data") in Block 315 is also sent to a Threshold module in Block 317 to be compared with an amplitude based threshold. The outputs of Block 315 and Block 317 are then passed on to an Amplitude Detection Algorithm 208.

The Threshold module in Block 317 has several methods of implementation. An example of a method commonly applied is a noise-riding threshold. The noise-riding threshold takes in the magnitude-squared spectral data and produces a vector that represents the noise floor of the RF environment and of tuners and digitizers block 205.

The Amplitude Detection Algorithm 208 detects amplitude peaks by identifying local maxima in the output of Block 315 above a defined threshold from Block 317. An operator can control the amount the local maxima exceeds the threshold. A typical value is 6 dB.

Block 321 describes computing the bandwidth for valid energy detections. Thereafter, a data array comprising frequency, bandwidth, amplitude, and time of detection is stored in a data structure termed as 'Energy Detection' in Block 323. Energy Detection data 217 is sent from the Energy Detection data structure 323 to the Three Dimensional Detections Process 221. The Energy Detection data 217 comprises information on valid and indeterminate energy detections.

Figure 4:
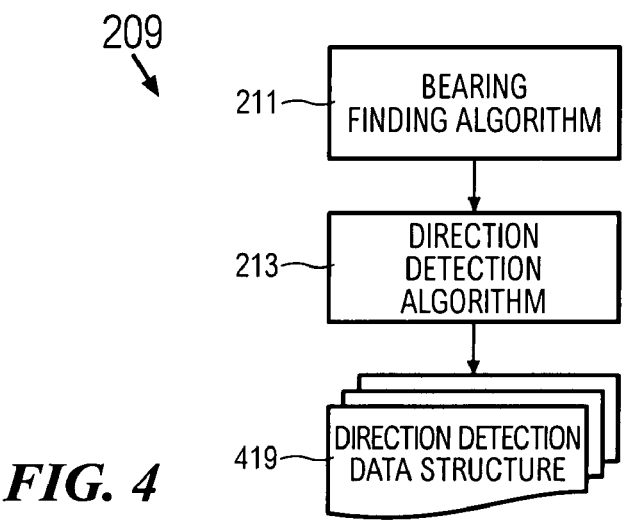
FIG. 4 is a flow chart of a Direction Detection Process.

FIG. 4 is a flow chart of the Direction Detection Process 209. The Direction Detection Process 209 comprises the Bearing Finding Algorithm 211 and the Directional Detection Algorithm 213. The Bearing Finding Algorithm 211 receives the RF data 206 as an input. The RF data 206 is processed by the Bearing Finding Algorithm 211 and sent to the Directional Detection Algorithm 213. After the RF data 206 is processed by the Directional Detection Algorithm 213 (described in the following paragraph), a data array representing the RF data 206 is stored in Direction Detection data structure 419. The Direction Detection data structure 419 passes Direction Detection data 219 to the Three Dimensional Detection Process 221 (described below in FIG. 6). The Direction Detection data 219 comprises information on valid and indeterminate direction detections.

The Bearing Finding Algorithm 211 identifies the bearing (direction) and a confidence level of the RF data 206. The confidence level relates to the accuracy of the bearing of the RF data 206. The Bearing Finding Algorithm 211 will typically work at less than one tenth of the overall minimum expected signal bandwidth.

The Bearing Finding Algorithm 211 computes a directional value and confidence value comprising directional information ranging from 0° to 360° and a corresponding confidence value of between 0.0 and 1.0. This confidence value represents the 'confidence' in the accuracy of the directional value. A value of 1.0 denotes a high correlation in the process used to compute the direction value. A confidence value of 0.0 denotes the directional value returned as essentially random and should not be used any further for subsequent calculations. This confidence value is typically based on the signal level of the analog RF signals 204 collected from the antenna array 203, the quality of the computations, and the repeatability of multiple measurements made at the same frequency. For example, multi-path echo, multiple emitters on the same frequency, and overloading of the tuners are typically causes of poor confidence values.

A vector of direction data ("direction vector data") comprising the directional value and confidence value, along with other RF signal characteristics, is then passed onto the Directional Detection Algorithm 213 (detailed below in FIG. 5).

Figure 5:
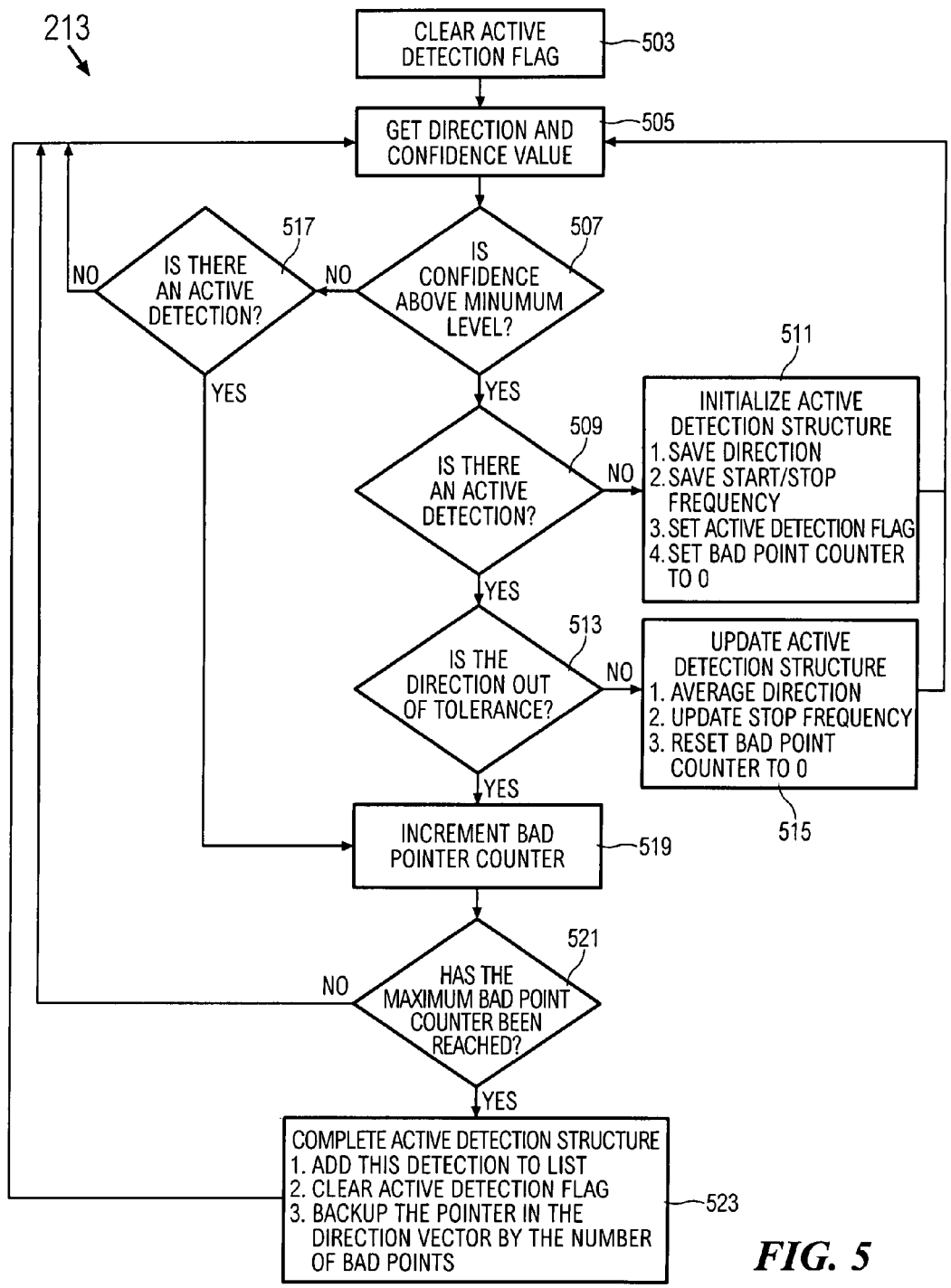
FIG. 5 is a flow chart of an Directional Detection Algorithm within the Direction Detection Process.

FIG. 5 is a flow chart of the Directional Detection Algorithm 213. The Directional Detection Algorithm 213 has, as an input, the direction vector data from the Bearing Finding Algorithm 211. The Directional Detection Algorithm 213 identifies contiguous frequencies for direction vector data that exceeds tolerance values. The tolerance values comprise a minimum confidence value and a tolerance range for the directional value.

The Directional Detection Algorithm 213 can also handle direction vector data with multiple directions as generated by directional algorithms based on techniques such as MUSIC (MUltipe SIgnal Classifier).

Block 503 describes clearing a flag, termed Active Detection flag when executing the Directional Detection Algorithm 213.

In Block 505, direction vector data is incrementally acquired (from the Bearing Finding Algorithm 211). The Block 505 also controls the number of times the direction vector data is processed in the algorithm 211.

In Block 507, the confidence level of the direction vector data is assessed. This conditional block will check if the current direction value has a confidence value above a minimum level as specified by the operator.

Block 509 checks for the presence of the Active Detection flag.

If the Active Detection flag is not present, Block 511 will initialize the Active Detection flag. Block 511 will save the current direction, confidence, amplitude, and set a start and stop frequency to the current frequency value as fields in an active detection structure. Block 511 will also set the Bad Point counter to zero. The bandwidth will be initialized to the current resolution bandwidth (RBW) of the input direction vector data. The flow is then sent to Block 505.

If Block 509 reveals a valid Active Detection flag, Block 513 will compare the current direction value to the direction value stored in the active detection structure in Block 511. If the difference exceeds a tolerance range specified by the operator, the flow will proceed to Block 515. For example, the tolerance range can be +/−5°. Alternatively, the flow will proceed to Block 519.

Upon exceeding the condition set in Block 513, Block 515 will update the active detection structure. The new amplitude and confidence value will be averaged into the active detection structure. The stop frequency will also be updated to the current frequency of the incoming direction vector data. The bandwidth field will be recomputed to begin at the start frequency and end using the stop frequency in the active detection structure. The bad point counter will also be reset to zero.

An indeterminate data point is defined as direction vector data of a particular frequency that falls outside the tolerance range in Block 513 or is below the minimum confidence level of Block 507. The confidence value of the indeterminate data points would be averaged into the final confidence value of the detection. The directional value of these indeterminate data points would not be used to compute the final direction value of the detection. The flow is then passed to Block 505.

Block 517 is another conditional block to check if the Active Detection flag is valid (true) after failing the minimum confidence test of Block 507. If the Active Detection flag is valid for an indeterminate data point, the flow is then passed to Block 519. Alternatively, the flow is passed to Block 505 to acquire the next direction and confidence value.

Block 519 will increment a Bad Pointer counter; caused by an indeterminate data point.

Block 521 will compare the Bad Pointer counter to the operator specified limit on the number of indeterminate data points admissible by the operator.

Block 523 is arrived at when the maximum bad pointer counter has reached a limit predetermined by the operator. Block 523 will add the information from the active detection structure to the Direction Detection data structure 419. This information is also passed as Direction Detection data 219 to the Three Dimensional Detection Process 221. This data contains the following values:

i. Center Frequency;
ii. Bandwidth;
iii. Amplitude;
iv. Direction; and
v. Confidence.

The amplitude in the Direction Detection data structure 419 is additional information that is generated by Block 205.

In addition to this, Block 523 will set the Active Detection flag to false. The flow is returned to Block 505 and the direction vector pointer decremented by the value of the Bad Pointer counter.

Figure 6:
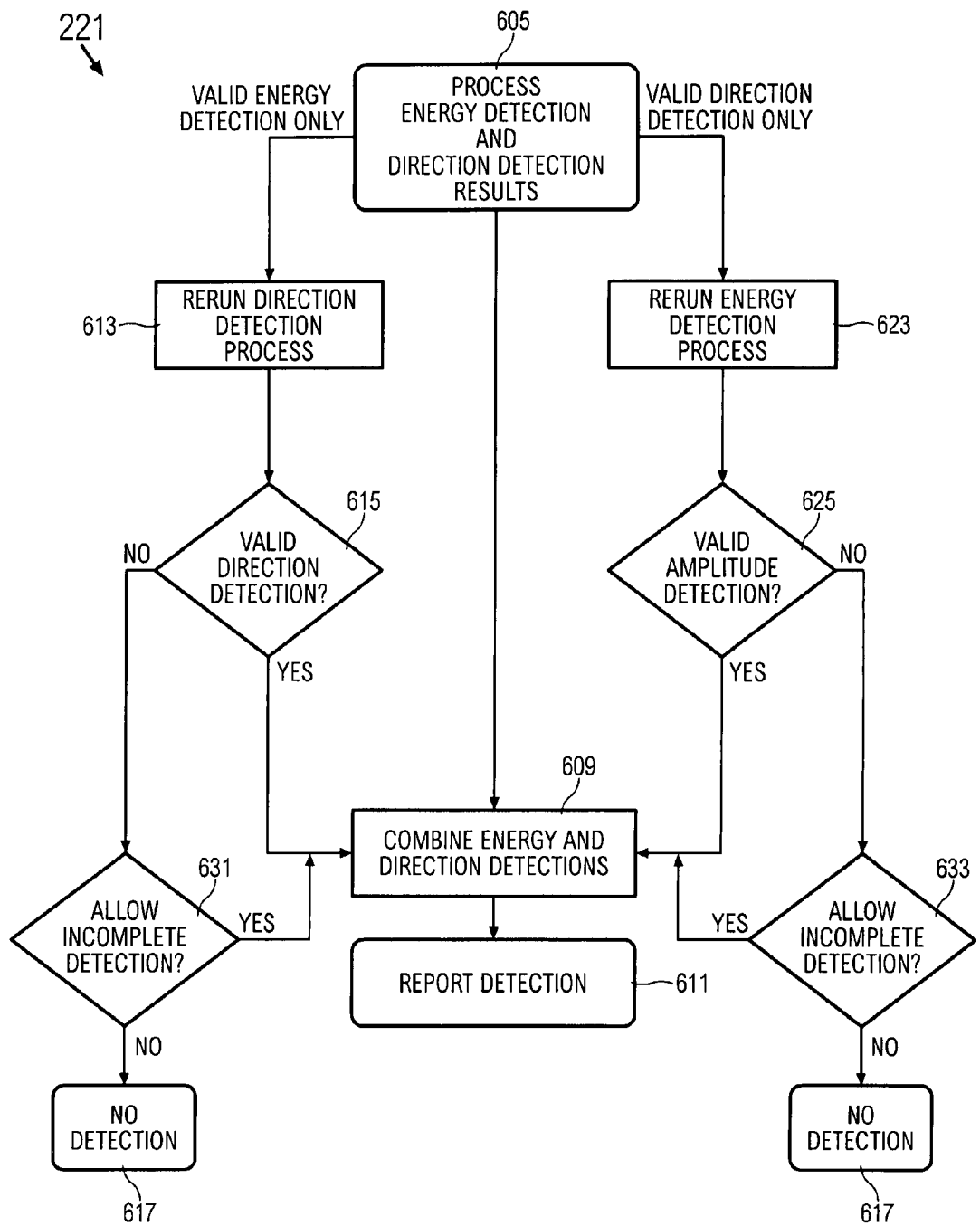
FIG. 6 is a flow chart of the Three Dimensional Detection Process.

FIG. 6 is a flow chart of the Three Dimensional Detection Process 221. The Three Dimensional Detection Process 221 has the Energy Detection data 217 and Direction Detection data 219 as inputs.

The Energy data 217 and Direction Detection data 219 streams may or may not contain an identical list of signals (with respect to frequency and bandwidth). The Three Dimension Detection Process 211 will read these two lists and compare their center frequencies and bandwidths to validate an energy detection and a direction detection.

Block 605 describes looping through the Energy Detection data 217 and matching primary data fields from the Direction Detection data 219. The primary data fields comprise the center frequency and bandwidth. A detection pair is an energy detection and a direction detection that share the same primary data fields.

Valid energy and direction detection pairs are sent to Block 609. A match is determined by the amount of overlap of the primary data fields of the energy and direction detections. This minimum amount of overlap in the primary data fields can be determined by the operator. Conversely, unresolved matches of Energy Detection data 217 are sent to block 613 and unresolved matches of Direction Detection Data 219 are sent to block 623. An unresolved match of Energy Detection data is a valid energy detection but with an indeterminate direction detection for the primary data field. The converse is true for unresolved Direction Detection data; a valid direction detection but with an indeterminate energy detection for the primary data fields.

Block 613 will reevaluate the Direction Detection Process 209 with less restrictive constraints over the primary data fields of the Energy Detection Data 217. Examples of less restrictive constraints include reducing the minimum confidence level in Block 507 or increasing the degree of tolerance allowed in Block 513. The degree of tolerance in Block 513 determines the proximity the new direction to the current direction stored in the active detection structure. As an example, the degree of tolerance can be altered from +/−5° degrees to +/−10° degrees during the reevaluation.

Block 615 will receive a detection pair comprising the valid energy detection from Block 605 and the reevaluated direction detection from Block 613. If Block 615 identifies a valid detection over the primary data fields, the energy and direction detection pair is sent on to Block 609, else it is sent to Block 631 for operator intervention.

In Block 631, the operator can intervene in Block 615 to generate a valid direction detection to override an indeterminate direction detection. This is possible if the quality of the energy detection alone is sufficient to determine an SOI. The flow is sent to Block 611 to designate the energy and direction detection as "No Detection" if the operator decides otherwise.

Similarly, Block 623 will reevaluate an indeterminate energy detection through the Energy Detection Process 207 with less restrictive constraints. For example, in Block 317 the amplitude threshold level may be reduced, or in Block 208 the parameters used to find a local maximum may be made less restrictive. By changing these parameters a new Energy Detection data 217 may be produced and sent to Block 625.

Block 625 will receive a detection pair comprising the valid direction detection from block 605 and the reevaluated energy detection from Block 623. If Block 625 evaluates both sets as valid detections, the detection pair is sent on to Block 609 else the flow is sent to Block 633 for operator intervention.

In Block 633, the operator can intervene to validate an indeterminate energy detection if the paired direction detection is sufficient to indicate an SOI. The flow is sent to Block 611 to designate the energy and direction detection pair as "No Detection" if the operator decides otherwise.

In Block 609 a validated energy detection and direction detection pair is reported as a successful detection (Block 611).

Figure 7:
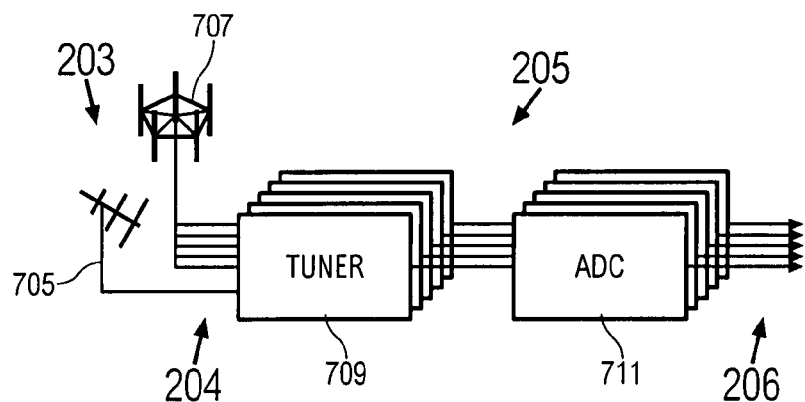
FIG. 7 is a system design of the antenna array, and the tuners and ADC module.

FIG. 7 is a system design of the antenna array 203, and the tuners and ADC module 205. The antenna array 203 comprises an omni-directional antenna 705 and several directional antennas in a directional antenna array 707. The omni-directional antenna 705 is required for the Energy Detection Process 207. The omni-directional antenna 705 can be implemented either as a separate antenna or as an antenna element within the directional antenna array 707.

FIG. 7 also illustrates a design implementation to enhance the Bearing Finding Algorithm 211 capabilities. The Bearing Finding Algorithm 211 can process at a much narrower bandwidth than conventional BF systems; the later works at the bandwidth of the analog RF signals 204. This narrow bandwidth requirement allows for an N-Channel system or a commutated system implementation. An N-Channel system has a separate tuner 709 and ADC 711 for each antenna in the directional antenna array 707. The sampling for this implementation is done coherently.

In an alternative implementation, the commutated system can be a pair of tuners and ADCs that are rapidly switched amongst antennas in the directional antenna array 707.

Performance of the signal search system 201 is enhanced with the N-channel system as a narrower resolution bandwidth is desirable for the detection of an SOI by the Bearing Finding Algorithm 211. A large resolution bandwidth can adversely affect the efficiency of the Bearing Finding Algorithm 211; a large resolution bandwidth comprising a single directional bin may contain multiple RF signals inducing the Bearing Finding Algorithm 211 to return incorrect results.

In a commutated system, the narrow resolution bandwidth drives the acquisition time of each commutated step to be longer. As a result of this, the modulation rate of the RF signal has to be low and the duration of the RF signal is longer than the total commutation measurement time for a bearing to be generated.

In a commuted system, each measurement is made at a different time. Thus the algorithm requires the analog RF signals 204 to be stationary over the acquisition time. Unfortunately, the analog RF signals 204 are modulated and the likelihood of the analog RF signals 204 being stationary is a low possibility. This is an issue when the commutation rate is similar to the modulation rate. For example, a Frequency Shift Key (FSK) signal is one that modulates between two frequencies. If the rate the FSK signal changes from the first frequency to the second is the same as the rate the commutated system steps between antennas in the antennal elements 707, then every odd numbered antenna in the directional antenna array 707 will observe the first frequency. The even numbered antennas in the directional antenna array 707 will observe the second frequency of the FSK signal. Thus the commutated system will be unable to compute a valid direction. Due to the simultaneous acquisition on an N-Channel system, the probability of an occurrence is extremely low compared to a commutated system.

In an N-channel system, each antenna in the directional antenna array 707 will receive the same signal since the RF signal data is acquired synchronously. A comparative example; halving the resolution bandwidth of a N-Channel system only doubles the acquisition time while a commutated system will require 2*M, where M is the number of antennas in the antenna array.

Figure 8:
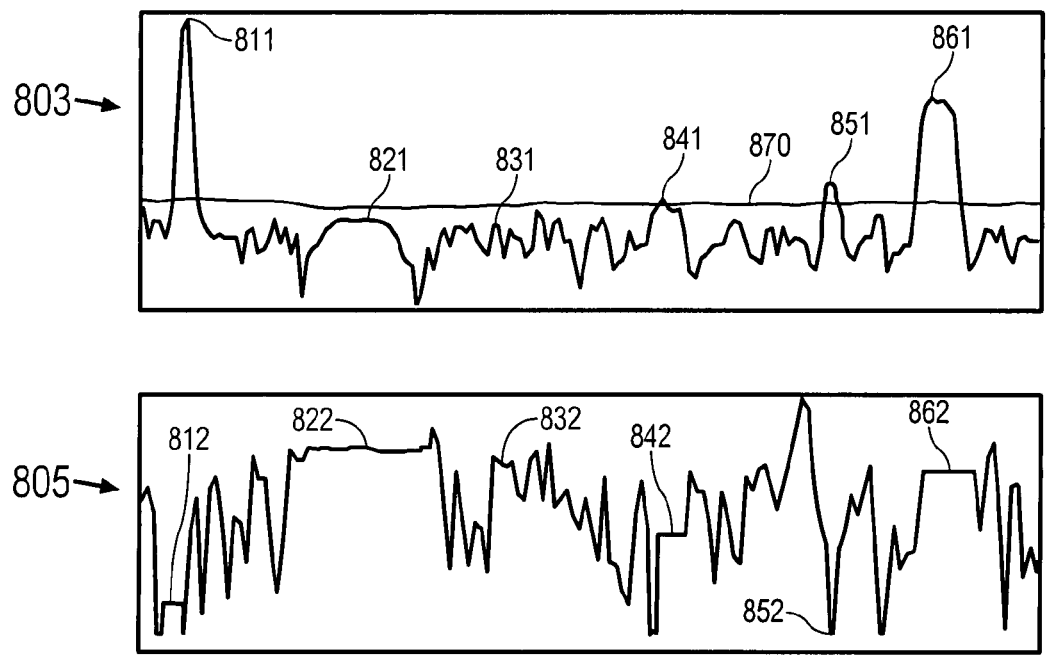
FIG. 8 illustrates two graphical plots of the signal search system incorporating the invention.

FIG. 8 illustrates two graphical plots of the signal search system 201 incorporating the invention. Graphical plot 803 is an illustration of the data stored in the Energy Detection data structure 323 of the Energy Detection Process 207. The vertical axis represents the amplitude of RF signals and the horizontal axis represents the frequency. An amplitude threshold is shown by the threshold line 870.

In this example, RF signals 811, 851 and 861 are well above the threshold line 870. An RF signal 841 is barely above the threshold line 870 and might not meet the energy detection criteria. An RF signal 821 is embedded into the noise floor and cannot be detected via the Amplitude Detection Block 208. RF signals 831 identifies a grouping of potential noise-like signals.

Graphical plot 805 is an illustration of the data stored in the Direction Detection data structure 419 of the Direction Detection Process 209. The vertical axis represents the direction of RF signals and scaled between 0° and 360°. The horizontal axis represents the frequency of the RF signals.

In graphical plot 805, five potential RF signals, 812, 822, 832, 842 and 862 are valid direction detections via the Directional Detection Algorithm 213.

The Three Dimensional Detection Process 221 receives the RF signals depicted in the graphical plots 803 and 805. In the above example, the paired RF signals 811 and 812, and 861 and 862, both have matching primary data fields and are valid energy and direction detections.

The RF signal 822 has a high quality direction detection but its pair, RF signal 821, does not have a valid energy detection. This is typical of a spread spectrum type of RF signal. The Three Dimensional Detection Process 221 would then reevaluate the energy detection data in Block 623. In this example, the reevaluation would not result in a valid energy detection. Due to high quality direction detection, the frequency and data identified by the high quality direction detection can be passed on to the backend processing sub-system 295. The backend processing sub-system will receive the energy and direction detections and use the frequency and bandwidth information to tune new incoming detections with specific signal processing algorithms to demodulate and decode signals on that frequency.

The RF signal 832 has poor direction detection and no energy detection, and would be reevaluated in the amplitude domain. The RF signal 831 it would not result in an energy detection, and due to a poor quality direction detection, would not be passed onto the backend processing system.

The RF signal 842 has an adequate direction detection. Fortunately, its paired RF signal 841 can be reevaluated in the amplitude domain with a lower threshold setting in Block 623. The RF signal is reported as a valid detection and its information stored in the Verified Detections data structure 223.

The RF signal 851 is detected in the Energy Detection Process 207 but its pair, RF signal 852 is not detected in the Direction Detection Process 209. An indeterminate detection of RF signal 852 could be caused by multiple scenarios: a short duration signal, multiple signals on the same frequency or as a result of multi-path propagation. The direction vector identified by RF signal 852 could be reevaluated with lower criteria in Block 613 in an attempt to generate a valid direction detection. If a valid direction detection surfaced, the signal would be passed to the Block 609, then Block 611, and eventually to a back-end sub-system for further processing.

While the embodiments described above constitute exemplary embodiments of the invention, it should be recognized that the invention can be varied in numerous ways without departing from the scope thereof. It should be understood that the invention is only defined by the following claims.

The invention claimed is:

1. A method for operating a computer to determine the characteristics an RF signal comprising:
   receiving an RF signal using an array of antennae;
   acquiring energy detection data of the RF signal;
   acquiring direction detection data of the RF signal; and
   processing the energy detection data using the direction detection data.

2. The method of claim 1, wherein acquiring the RF signal to identify the energy detection data comprises applying an amplitude detection algorithm to the RF signal.

3. The method of claim 2, wherein processing the energy detection data using direction detection data further comprises reevaluating the energy detection data by adjusting the amplitude detection threshold to a lower level.

4. The method of claim 1, wherein acquiring the direction detection data of the RF signal includes passing the RF signal through a bearing finding algorithm, the bearing finding algorithm to produce direction vector data, the direction vector data to include a confidence value and a direction value of the RF signal.

5. The method of claim 4, wherein acquiring the direction detection data of the RF signal comprises passing the direction vector data through a directional detection algorithm, the directional detection algorithm identifying the direction detection data using the direction vector data and tolerance values.

6. The method of claim 5, wherein processing the energy detection data using direction detection data further comprises reevaluating the direction detection data using the tolerance values with less restrictive constraints.

7. The method of claim 1, wherein processing the energy detection data using the direction detection data to determine the characteristics of the RF signal comprises matching frequency and bandwidth values of the energy detection data to the frequency and the bandwidth values of the direction detection data.

8. The method of claim 7, wherein processing the energy detection data using the direction detection data further comprises an operator validating an unresolved energy detection data or an unresolved direction detection data.

9. The method of claim 1, further comprising passing the energy detection data and the direction detection data to a backend processing sub-system.

10. The method of claim 9, further comprising tasking processing resources of the backend processing sub-system using the energy detection data and the direction detection data.

11. The method of claim 9, wherein filtering capabilities of the backend processing sub-system allows one or more specified directions of the directions detection to be passed onto the backend processing sub-system.

12. A computer readable medium containing code thereon, the code providing instructions to an RF signal search system that allow that search system to identify an RF signal received by an array of antennae, the code causing said RF signal search system to execute the steps of:
   producing energy detection data of the received RF signal through a first process;
   producing direction detection data of the received RF signal through a second process; and
   processing the energy detection data using the direction detection data through a third process to identify the received RF signal.

13. The computer readable medium containing code thereon as recited in claim 12, the code providing instructions to the RF signal search system for executing the additional steps of storing the direction detection data and the energy detection data in a backend processing sub-system, the backend processing sub-system tasking processing resources of the backend processing sub-system using the energy detection data and the direction detection data or using filtering capabilities of the backend processing sub-system to allow one or more specified directions of the directions detection data to be passed onto the backend processing sub-system.

14. The computer readable medium containing code thereon as recited in claim 12, the code providing instructions to the RF signal search system for executing the additional step of identifying direction vector data in the second process, the direction vector data comprising a confidence value and a direction value of the RF signal.

15. The computer readable medium containing code thereon as recited in claim 14, wherein the direction detection data is identified using the direction vector data and tolerance values.

16. The computer readable medium containing code thereon as recited in claim 15, wherein the third process comprises reevaluating the direction detection data in the second process using the tolerance values with less restrictive constraints.

17. The computer readable medium containing code thereon as recited in claim 13, wherein the third process comprises reevaluating the energy detection data in the first process using an amplitude detection threshold at a lower value.

18. A search system to identify an RF signal received by an array of antennae, comprising:
   a processor disposed to acquire direction detection data and energy detection data of the received RF signal; and
   the processor processing the energy detection data using the direction detection data.

19. The search system in claim 18, wherein the tuner and the ADC comprise an N-channel system implementation or a commutated system implementation.

20. The search system in claim 18, further comprising a backend processing sub-system, the backend processing sub-system disposed to store the direction detection data and the energy detection data.

* * * * *